(12) United States Patent
Collombet et al.

(10) Patent No.: US 9,776,810 B2
(45) Date of Patent: Oct. 3, 2017

(54) METHOD AND SYSTEM FOR CONTROLLING ITEMS ON A PRODUCTION/DISTRIBUTION LINE

(71) Applicant: SICPA HOLDING SA, Prilly (CH)

(72) Inventors: Yvan Collombet, Peron (FR); Daniel Cotsford, Clarens (CH); Rodrigo Lorca, Aclens (CH); Luciano Torres, Vevey (CH); Christian Fefin, Malbuisson (FR)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/360,797

(22) PCT Filed: Nov. 23, 2012

(86) PCT No.: PCT/EP2012/073480
§ 371 (c)(1),
(2) Date: May 27, 2014

(87) PCT Pub. No.: WO2013/079409
PCT Pub. Date: Jun. 6, 2013

(65) Prior Publication Data
US 2014/0330429 A1 Nov. 6, 2014

Related U.S. Application Data

(60) Provisional application No. 61/564,116, filed on Nov. 28, 2011.

(30) Foreign Application Priority Data

Nov. 28, 2011 (EP) ..................................... 11009412

(51) Int. Cl.
G06Q 10/06 (2012.01)
B65G 51/44 (2006.01)
(Continued)

(52) U.S. Cl.
CPC .............. *B65G 51/44* (2013.01); *B65B 57/10* (2013.01); *G06Q 10/06* (2013.01); *G06Q 50/28* (2013.01)

(58) Field of Classification Search
CPC ........ B65B 57/10; G06Q 50/28; G06Q 10/06; B65G 51/44
See application file for complete search history.

(56) References Cited

U.S. PATENT DOCUMENTS

2003/0132855 A1* 7/2003 Swan .................. G07C 9/00111
340/8.1
2004/0143505 A1* 7/2004 Kovach ................ G06Q 10/087
705/23

(Continued)

FOREIGN PATENT DOCUMENTS

MX 2014/006353 6/2014
WO WO2013079408 6/2013

OTHER PUBLICATIONS

Mexican Office Action in counterpart Mexican Application No. MX/a/2014/006354, dated Mar. 31, 2016, and English-language translation thereof.

(Continued)

*Primary Examiner* — Sonji Johnson
(74) *Attorney, Agent, or Firm* — Greenblum & Bernstein, P.L.C.

(57) ABSTRACT

The disclosed method, and corresponding system, for controlling items on a production/distribution line relies on secure identification of items transported arranged according to a given disposition along a transport path at different sites of the line and checking operation according to a protocol which allows reducing processing load while ensuring high reliability.

16 Claims, 3 Drawing Sheets

(51) Int. Cl.
*G06Q 50/28* (2012.01)
*B65B 57/10* (2006.01)

(56) References Cited

U.S. PATENT DOCUMENTS

| | | |
|---|---|---|
| 2006/0200261 A1* | 9/2006 | Monette ............ G05B 19/4183 700/108 |
| 2008/0121537 A1 | 5/2008 | Sankaran et al. |
| 2010/0234982 A1 | 9/2010 | Sankaran et al. |
| 2011/0270432 A1 | 11/2011 | Carpenter et al. |

OTHER PUBLICATIONS

Ukrainian Office Action in counterpart Ukrainian Application No. a 2014 07215, dated Sep. 23, 2015, and translation thereof.
Mexican Office Action in counterpart Mexican Application No. MX/a/2014/006354 dated Jul. 11, 2016 (with English-language translation).
Mexican Office Action in counterpart Mexican Application No. MX/a/2014/006354, dated Dec. 1, 2015, and English-language translation thereof.
Mexican Office Action in counterpart Mexican Application No. MX/a/2014/006354, dated Aug. 17, 2015, and translation thereof.
Colombian Office Action in counterpart Colombian Application No. 12-139.378, dated Aug. 20, 2015, and translation thereof.

* cited by examiner

METHOD AND SYSTEM FOR CONTROLLING ITEMS ON A PRODUCTION/DISTRIBUTION LINE

TECHNICAL FIELD

The present invention relates to the technical field of control systems for automated production or distribution lines. The invention particularly relates to the technical field of systems for tracking and tracing items on a production/distribution line.

BACKGROUND OF THE INVENTION

Many methods are implemented in industry for controlling production/distribution lines, not only for detecting problems arising on transport paths but also reliably determining a quantity of items produced or distributed on said lines. Particularly, some of these methods are used for ensuring proper dispatching or packaging of said items, or even further allowing accurate billing or tax accounting of the items so produced or distributed.

Imaging devices are of common use for controlling production of items on automated production lines. For example, on bottling lines, strobe light (using a LED lighting unit controlled by a laser trigger device which detects presence of an item, for example) illuminates bottles transported on a conveyor and marked with a barcode (1D or 2D barcode, like SKU code or data matrix, for example), and digital cameras take digital images of the so illuminated bottles. A strobe light source typically uses a LED lighting unit controlled by a laser trigger device, which detects the presence of an item. Conventional image processing means then automatically detect on a digital image of an item a region of interest containing a barcode pattern and then identify the item by decoding the detected barcode. Such identification may be used, for example, for correctly labeling the above bottles according to their type (or content, etc.). There are many known techniques relating to image processing which can be used for identifying an item marked with an identifier (including item identification data) from a digital image of said identifier.

The above imaging devices, or readers, may be adapted to read identifiers from light reflected or emitted by said identifier within any optical wavelength range between the UV (ultraviolet) and the IR (infrared).

There are also many other well known techniques adapted to different types of identifiers. For example, a RFID reader is adapted for reading identifiers like RFID tags disposed on items, these RFID tags including item identification data (possibly encrypted). As another non-limiting example, the identifier may be a magnetic marking, and the corresponding adapted reader is then of magnetic sensor type.

Thus, whatever specific type of identifier including identification data is used for marking items transported on a production/distribution line, an adapted type of reader is used for reading said identifier and sending a corresponding reader signal to a controller having processing means capable of extracting identification data from said reader signal.

Most often, items on a production distribution line are transported (for example, on a conveyor) arranged according to a given disposition all along a transport path. This given disposition may correspond to items in single file, or may be different, like for items grouped in columns or any other geometrical disposition. The items may as well be transported by batch, the items having said given disposition within the batch. As a non-limiting example, the items may be transported already packed by batch within a packaging adapted for allowing a reader to read identifiers on the items. As an illustration, for example in case the items are cigarette packs, and the identifier is a barcode printed on the pack (or on a label stuck on the pack), said adapted packaging may then be a transparent film wrapped around a batch of cigarette packs so that an optical reader can read the barcodes through the film.

Generally, in case a distribution of items, or a packaging of items, possibly by batch of a given number N (N≥1) of items, is carried out on a production/distribution line, the items are transported arranged according a given disposition along a transport path from a first zone toward a second zone on the line, each transported item being marked with a unique item identifier including unique item identification data of the item, the items transported from the second zone are then collected by a collector device (like a pusher, for example) to form a batch of a given number N of said items. The collector device generally includes a sensor operable to detect that a batch of N items has been formed (for example, a mechanical counter, or an electronic counter in which a light beam between diodes is interrupted by a transported item). This sensor is operable to deliver a batch signal each time a batch of N items has been counted. Operations on the line are generally controlled by a controller. Also, mounted on the line, at the level of the first zone, a reader connected to the controller typically reads the unique identifier on each one of the items within said first zone, and sends corresponding reader signal to the controller. The controller has processing means capable to extract each unique item identification data from the received reader signal in accordance with an ordering corresponding to said given disposition of the items. These processing means may in fact be split, for example, between the controller itself and the reader (i.e. some processing steps of the reader signal being then executed at the reader), or may even involve a remote connected processing unit.

As an example, in case the items are transported in single file and the identifier is a barcode, the reader classically comprises a camera (or a plurality of cameras around the first zone, and possibly including illumination source for illuminating the items to be imaged) set for reading a barcode on one item at the time crossing the first zone, by taking a digital image of a region of interest containing the barcode on the (illuminated) item. Many known methods are available to be used by the processing means for detecting and decoding the digital image of the barcode sent by the reader. As another non-limiting example, in case the items are transported grouped according to a given disposition, the first zone has an extension covering a group of items, and the reader may be a camera capable to take a digital image of a group of items in the first zone, as known in the art. Then the processing means are capable to detect each barcode within the digital image, and extract the corresponding identification data for each item according to an ordering which corresponds (by a one-to-one mapping) to the respective positions of the items within the group.

In the above conventional production/distribution line, due to physical constraints it may be not possible to bring the first and second zones closer together with each corresponding reading equipment, particularly to allow maintenance by technicians of said reading equipment and also of the sensor and collector device near the second zone, without excessive perturbation of the line. Indeed, for reading each item crossing the first zone, generally at high speed on modern production/distribution lines, the real-time reader equipment is quite sizable.

However, due to quite frequent jams on the line causing loss or deterioration of items, or even due to fraudulent interception of items between the two zones, it is not sure that all the items identified by the reader in fact correspond to the items counted at the sensor level, i.e. after the second zone. Thus, problems are generated in case items having being identified on the line (and thus, possibly accounted for taxation, or billed as being delivered) are lost before being collected by the collector device, or in case the collected batches of items in fact contain unidentified items and are nevertheless distributed, or packaged.

Consequently, the above conventional controlling of operations is not well adapted to real-time item identification, particularly on high speed production or distribution lines, and especially if every single item passing on the line needs to be identified.

SUMMARY OF THE INVENTION

In view of the above mentioned limitations of the background art, the present invention is therefore aimed at providing a robust real-time method and a corresponding system for controlling items on a production/distribution line. An object of the invention is to provide a production/distribution control tool which is well adapted to high speed production/distribution lines carrying items maintained in a given disposition on the transport path, whilst being capable of processing read signals for every single item passing on the line, for precise identification of collected items, all necessitating only limited computing resources and yet allowing easy access to equipment on the line.

In the following, the processing means of a controller, and thus processing steps carried out via said processing means, are defined in a broad sense which includes the possibility of being distributed between a plurality of units connected to the controller (as known in the art), although being designated as processing means of the controller.

According to a first aspect, the invention relates to a method for controlling items on a production/distribution line wherein, the items being transported arranged according a given disposition along a transport path from a first zone toward a second zone on the line, each transported item being marked with a unique item identifier including unique item identification data of the item, the items transported from the second zone being collected by a collector device to form a batch of a given number N of said items, said collector device including a sensor operable to detect that a batch of N items has been formed and deliver a corresponding batch signal, wherein a first reader reads the unique identifier on each one of the items within said first zone, the first reader being connected to a controller and sending corresponding first reader signal to the controller, the controller extracting each unique item identification data from the received first reader signal in accordance with an ordering corresponding to said given disposition of the items, said method comprising the further steps of:

sequentially storing in a memory connected to the controller, to form a list of unique item identification data, each unique item identification data extracted from said first reader signal according to an ordering corresponding to said given disposition of the items, by means of the controller;

upon delivering of a batch signal by the sensor, reading at least one unique item identifier on at least one test item at a corresponding test position according to said ordering within the second zone by means of a second reader connected to the controller, the second reader sending corresponding second reader signal to the controller;

extracting each unique item identification data from a received second reader signal, and searching in the list the unique item identification data matching said unique item identification data extracted from the second reader signal to obtain matching unique item identification data corresponding to said at least one test item, and retrieving in the list, according to said ordering and test position, among the unique item identification data preceding said matching unique item identification data and which correspond to unique item identification data of the N items forming the batch of collected items, at least one unique identification data by means of the controller; and storing in the memory said retrieved at least one unique item identification data as corresponding to an at least one item of the batch of collected items, by means of the controller.

Due to the ordering of the extraction of each item identification data, in one-to-one correspondence with the relative positions of the items disposed on the transport path in the first zone, all the items within the first zone can be identified whatever is said given disposition of the items. Thus, the invention is well adapted to high speed production/distribution lines carrying items maintained in a given disposition on the transport path, whilst being capable of processing read signals for every single item passing on the line. In a preferred embodiment of the above method, and corresponding system (see below), the second reader in fact reads one identifier on one test item at a test position in the second zone. Thus, as the second reader may only have to read a reduced number of identifiers (i.e. less than N), and even as few as only one identifier, on the items within the second zone, the corresponding equipment can be quite simple and compact, and thus does not limit access to the line, particularly for maintenance of the collector device or the line itself at the level of the second zone. Also, the identification by means of the second reader of a test item, triggered by the batch signal, and the check of matching with item identification data already stored (as extracted from a first reader signal) allow more reliably determining the effective content of the batch of items collected by the collector device, as there is a "double check" of the identity of at least some of the items transported between the two zones. As this "double checking" operation may not concern all the N items to be collected to form a batch, the required calculations are not intensive and the corresponding load on the processing means is not excessive, and the overall operation of qualifying the content of a collected batch can be quickly executed.

With said method according to the invention, in case an item is removed from the transport path between the first and second zone, it will not be counted by the sensor (although the batch signal still indicates that N items have been collected by the collector device) and thus, due to said known ordering and test position, a relative rank in the list of the matching item identification data will not be same from a collected batch of N items to the next one: as a result, loss of an item may be detected. Indeed, successive lines in the list in fact correspond to each successively extracted unique item identification data (according to the ordering) so that a matching unique item identification data corresponding to a test item at a given test position must have a rank (or line number, modulo N) in the list which is the same from a block of N lines to the next one (corresponding to a batch of N collected items to the next batch to be collected). Thus, if any item is removed from the line between the first and the second zone, the rank in the list corresponding to the matching unique item identification data, for a test item at a given test position, will then be shifted away (by a number equal to the number of removed items) from the rank generally corresponding to said test position within the block of N lines relating to the next batch of items to be collected. In case an item is added on the line, the shift may also be detected (the matching rank being then shifted toward the rank corresponding to the test position). Accordingly, in a variant of the invention, the controller detects that a relative rank in the list of the matching unique item identification data of a test item at a test position is shifted with respect to the relative rank generally corresponding to said test position, and associates in the memory a rank error message to the retrieved at least on unique item identification data stored in the memory.

In a variant of the above invention, the level of security may even be increased by allowing the controller to set the test position of a test item within the second zone (this setting may further programmed to vary over time). The number of test items may also be set. In case only few test items are read in the second zone, it is thus not possible for an observer to know in advance which items will be read. As a consequence, the possibility to detect unidentified item and/or a fraudulent interception is increased, even directly at the second zone. In another variant of the above invention, a clock may deliver time data to the controller which may associate this time data with the item identification data as they are stored in the memory (according said ordering), thus allowing a technician consulting the list stored in the memory to better diagnose a cause of a problem on the line.

According to a first variant of the above method according to the invention, in case the controller fails to extract a unique item identification data from a received first reader signal or a received second reader signal, it respectively delivers a first or a second identification error data as the unique item identification data respectively corresponding to said received first or second reader signal. This allows keeping track of any extraction problem in the list. In said first variant, the controller may further have the possibility to deliver an error message, so as to help a technician diagnosing a cause of an error in case an extraction of item identification data has failed. Consequently, the method may include the further step, in case the controller extracts a unique item identification data from a received second reader signal but fails retrieving a matching unique item identification data in the list, of delivering an error message, by means of the controller. In this case, the error message may further indicate a matching error. According to the method, in case the controller fails to extract a unique item identification data from a received second reader signal and fails retrieving a matching second identification error data in the list, the controller may deliver an error message. In this case, the error message may further indicate an extraction error relating to a second reader signal. Also, in case the controller fails to extract a unique item identification data from a received second reader signal but retrieves a matching first identification error data in the list, the controller may deliver an error message. In this case, this error message may further indicate an extraction error relating to both a first and a second reader signal. Moreover, in case any error message is delivered, the controller may further store said error message in the memory. An error message delivered by the controller may further be sent to a display (possibly associated with time data delivered by the above mentioned clock), in order to alert an operator watching operations on the line, for example, or may be sent, as well as any part of the data stored in the memory, to a remote device via appropriate transmission means. The above possibility of detecting and signaling errors is advantageous, as it is easy to retrieve from the list a batch of which content is concerned by an error message without having to stop the line or affect the sequential storage of item identification data relating to the next items arriving in the first zone.

According to a second aspect of the invention, the above method is adapted for better securing item identification in packaging operations on the line. Accordingly, any one of the above mentioned variants of the method for controlling items on a production/distribution line, wherein said collector device is further operable to deliver a batch of N collected items to a packaging device connected to the controller and operable to pack the batch of N items delivered by the collector device into a batch packaging marked with a batch identifier including batch packaging identification data, comprises the further steps of:

upon delivering of a batch signal by the sensor, packing the batch of items received from the collector device into a batch packaging to form a packed batch, and delivering said packed batch by means of the packaging device;

reading the batch identifier on the batch packaging of said delivered packed batch by means of a third reader mounted on the line and connected to the controller, the third reader sending corresponding third reader signal to the controller;

extracting batch packaging identification data from the third reader signal received from the third reader and storing the extracted batch packaging identification data in the memory associated with said retrieved at least one unique item identification data corresponding to an at least one item of the batch of collected items packed into said delivered batch packaging, by means of the controller.

Thus, as it is possible to keep track of at least one identified item contained in a packed batch associated with batch packaging identification data, more reliable track and trace operations, or tax accounting operations, are then possible based on said stored associated data.

According to a first variant of the above second aspect of the method of the invention, in case an error message is delivered by the controller as indicated above, a further step of associating in the memory said error message with the corresponding extracted batch packaging identification data of the batch packaging of the delivered packed batch, is carried out by the controller. This feature allows better tracing the history of the aggregation or packaging operations on the line. Particularly, for identifying batches containing unknown items (not identified) in case specific action is required: such as ejection of a batch or special labeling. Moreover, any error message may further be uploaded and accessible through reports. Also, time data delivered by a clock may further be associated to said error message and said corresponding extracted batch packaging identification data of the batch packaging of the delivered packed batch.

The invention also relates to a system for controlling items on a production/distribution line which is operable to implement any of the above mentioned aspects and/or variants of the method for controlling items on a production/distribution line according to the invention, and also corresponding use of said system, as specified above. Particularly, according to a third aspect, the invention relates to a system for controlling items on a production/distribution line, comprising transport means operable to transport items arranged according a given disposition along a transport path of the line from a first zone toward a second zone on the line, each transported item being marked with a unique item identifier including unique item identification data of the item, a collector device operable to collect the items transported from the second zone to form a batch of a given number N of said items and deliver said formed batch of items, said collector device including a sensor operable to detect that a batch of N items has been formed and deliver a corresponding batch signal, the system further comprising a first reader mounted on the line operable to read a unique item identifier on each one of the items within the first zone and deliver corresponding first reader signal, and a controller connected to the first reader operable to receive a first reader signal and extract each unique item identification data from said received first reader signal in accordance with an ordering corresponding to said given disposition of the items, the system being such that:

the controller is operable to sequentially store in a memory connected to the controller each unique item identification data extracted from said first reader signal according to said ordering, to form a list of unique item identification data;

upon delivering of a batch signal by the sensor, a second reader connected to the controller is operable to read at least one unique item identifier on at least one test item at a corresponding test position according to said ordering within the second zone, the second reader being operable to send corresponding second reader signal to the controller;

the controller is operable to extract each unique item identification data from a received second reader signal, search in the list the unique item identification data matching the unique item identification data extracted from the second reader signal to obtain matching unique item identification data corresponding to said at least one test item, and retrieve in the list, according to said ordering and test position, among the unique item identification data preceding said matching unique item identification data and corresponding to unique item identification data of the N items forming the batch of collected items, at least one unique item identification data; and the controller is further operable to store in the memory said retrieved at least one unique item identification data as corresponding to an at least one item of the batch of collected items.

In a variant of the above system according to the invention, the level of security may even be increased by allowing the controller to set the test position of a test item within the second zone. The number of test items may also be set. In another variant of the above invention, a clock may deliver time data to the controller which may associate this time data with the item identification data as they are stored in the memory.

According to a first variant of the above system according to the invention, in case the controller fails to extract a unique item identification data from a received first reader signal or a received second reader signal, it may be operable to respectively deliver a first or a second identification error data as the unique item identification data respectively corresponding to said received first or second reader signal.

In the above system, in case the controller further extracts a unique item identification data from a received second reader signal but fails retrieving a matching unique item identification data in the list, the controller may be operable to deliver an error message. This error message may indicate a matching error.

According to the above system, in case the controller fails to extract a unique item identification data from a received second reader signal and fails retrieving a matching second identification error data in the list, the controller may further be operable to deliver an error message. This error message may indicate an extraction error relating to a second reader signal. Also, in case the controller fails to extract a unique item identification data from a received second reader signal but retrieves a matching first identification error data in the list, the controller may be operable to deliver an error message. This error message may indicate an extraction error relating to both a first and a second reader signal. Moreover, in case an error message is delivered by the controller, the controller may further be operable to store said error message in the memory. For example, an error message delivered by the controller may also be sent to a display (possibly associated with time data delivered by the above mentioned clock), in order to alert an operator watching operations on the line. This error message, as well as any part of the data stored in the memory, may further be sent to a remote device via appropriate transmission means.

According to a fourth aspect of the invention, the above system is adapted for better securing item identification in packaging operations on the line. Accordingly, any one of the above mentioned variants of the system for controlling items on a production/distribution line, wherein said collector device is further operable to deliver a batch of N collected items to a packaging device connected to controller and operable to pack the batch of N items delivered by the collector device into a batch packaging marked with a batch identifier including batch packaging identification data, is such that:

upon delivering of a batch signal by the sensor, the packaging device is operable to pack the batch of items received from the collector device into a batch packaging to form a packed batch, and deliver said packed batch;

a third reader mounted on the line and connected to the controller is operable to read a batch identifier on the batch packaging of a packed batch delivered by the packaging device, the third reader being operable to send corresponding third reader signal to the controller; and the controller is operable to extract batch packaging identification data from a third reader signal received from the third reader and store the extracted batch packaging identification data in the memory associated with retrieved at least one unique item identification data stored in the memory corresponding to an at least one item of the batch of collected items packed into said delivered packed batch.

According to a variant of said fourth aspect of the invention, in case an error message is delivered by the controller as indicated above, the controller is further operable to associate in the memory said error message with the corresponding extracted batch packaging identification data of a batch packaging of a packed batch delivered by the packaging device. Also, time data delivered by a clock may further be associated to said error message and said corresponding extracted batch packaging identification data of the batch packaging of the delivered packed batch.

The present invention will be described more fully hereinafter with reference to the accompanying drawings in which like numerals represent like elements throughout the several figures, and in which prominent aspects and features of the invention are illustrated.

DETAILED DESCRIPTION

Figure 1:
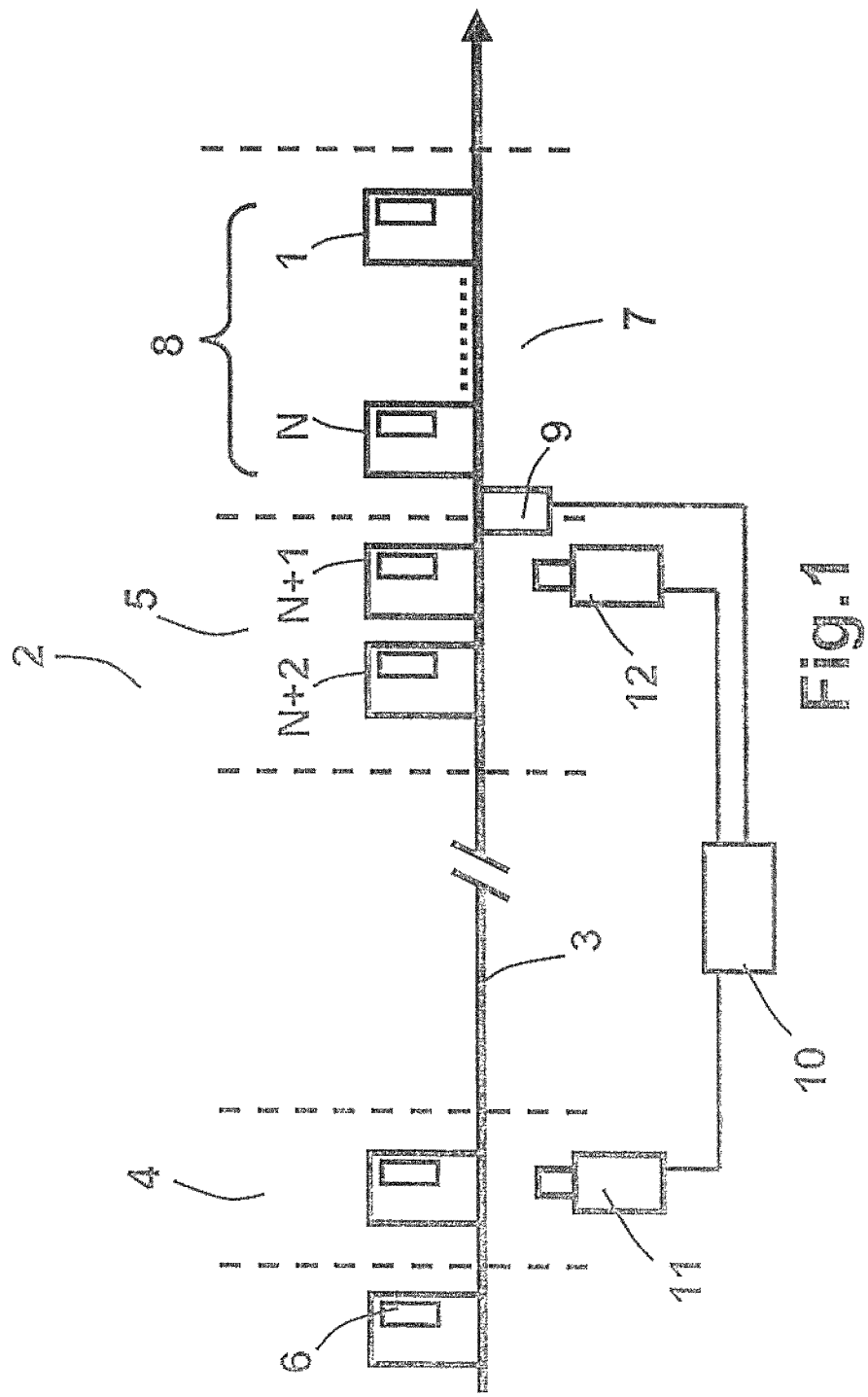
FIG. 1 is a schematic view of control system of a production/distribution line illustrating an embodiment of the invention.
Figure 2:
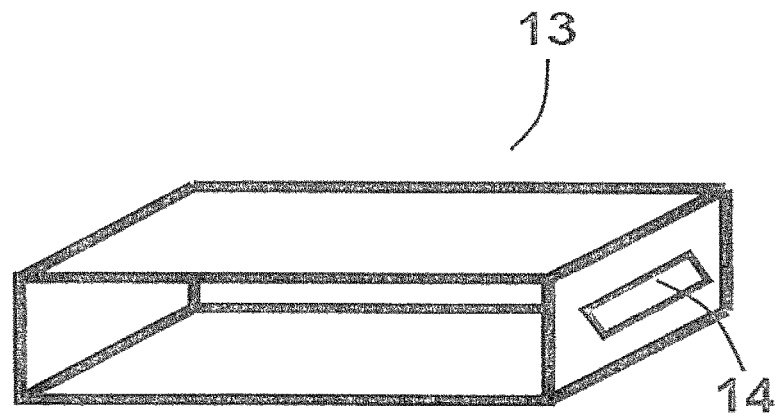
FIG. 2 is a schematic view of a batch packaging for packing items.
Figure 3:
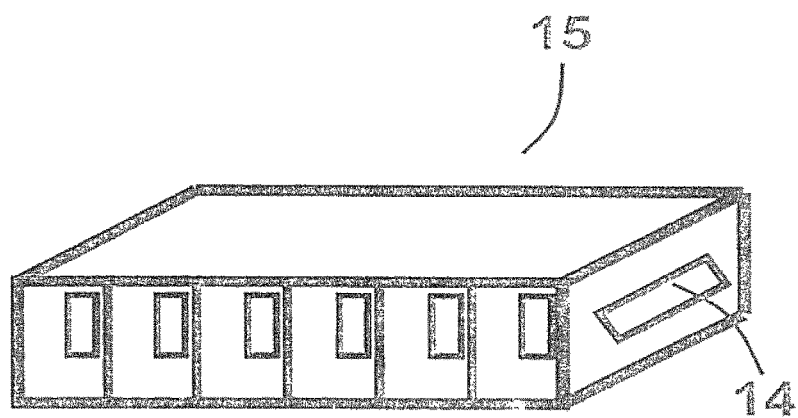
FIG. 3 is a schematic view of a packed batch of items.

In the following non-limiting and illustrative embodiment of the invention, a system for controlling packaging operations on items on a production/distribution line (2), as illustrated on FIG. 1, comprises a conveyor (3) for transporting items (1, 2, . . . , N, N+1, . . . ) arranged in single file along the transport path from a first zone (4) toward a second zone (5) on the line. Each item is marked with a unique item identifier (6), here a barcode, which includes unique item identification data of the item. A controller (10) controls the operations on the line. A pusher (7) (i.e. collector device), connected to the controller (10), collects the items transported from the second zone (5) to form a batch (8) of a given number N of said items. The pusher (7) delivers said formed batch of items (8) to a packaging device (not represented), also connected to the controller, which packs the received batch of N items (8) into a batch packaging (13) shown on FIG. 2, to obtain a packed batch of items (15) shown on FIG. 3.

The pusher (7) device includes a sensor (9) connected to the controller (10) for detecting that a batch of N items has been formed. This sensor (9) may be a laser trigger equipped with a counter (which counts the number of times the laser beam has been cut off), for example, or a mere detector of presence of an item at specific place within the pusher. Once the sensor (9) has determined that a batch of N items is formed, it delivers a batch signal to the controller (10). The system further comprises a first camera (11) (i.e. first reader) mounted on the line and connected to the controller (10). The first camera (11) is equipped with an illumination source (not shown) for sequentially illuminating each item crossing the first zone (i.e. the view field of the first camera), and operable to read a unique item identifier (6) on each item transported across the first zone (4). This first camera (11) delivers corresponding first reader signal, corresponding to digital image of an item identifier, to the controller (10). The controller has processing means (CPU unit) and a memory, and is operable to perform image processing of a digital image received from the first camera, and extract a unique item identification data from the received first reader signal in accordance with an ordering corresponding to said given disposition, here in single file, of the items (depending on which camera is used, some image processing operations may be executed by the camera itself, and the result is then transmitted to the controller). In fact, a mere sequential imaging of each item passing through the first zone is carried out here, the ordering merely reduces to that of the sequential passage of the items through the first zone. As known in the art, the first camera may be triggered with sensor means (a conventional laser trigger, for example) which detect a passage of an item within the first zone and thus triggers illumination of the passing item and activate the first camera to take an image of the item.

Figure 4:
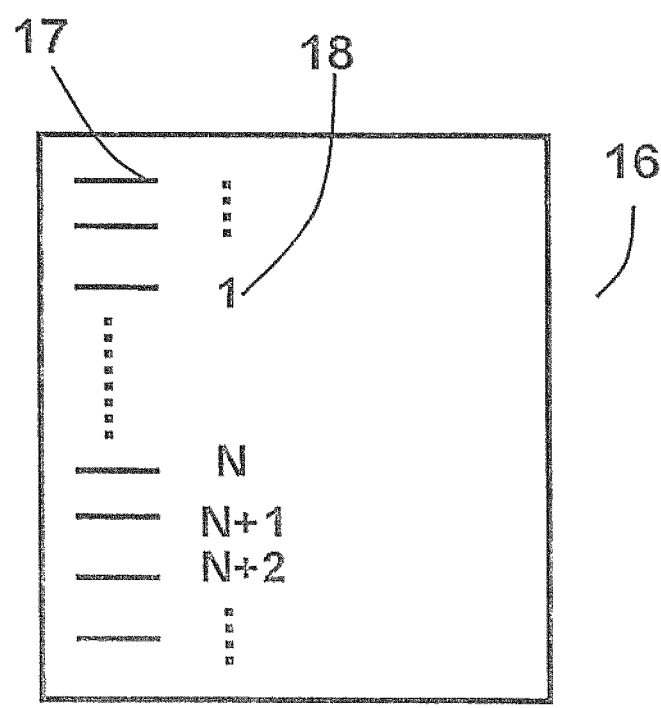
FIG. 4 illustrates a list resulting from sequential storing of unique item identification data according to the embodiment of FIG. 1.

According to the invention, the controller (10) is operable to sequentially store in the memory each unique item identification data extracted from a first reader signal according to said ordering, so as to form a list (16) of unique item identification data (17) shown in FIG. 4 (each successive line (17) corresponding to each item identification data sequentially stored). For better understanding the invention, there is also indicated on FIG. 4 a rank (18) of corresponding items in a collected batch (8) (i.e. ranks 1, . . . , N) and of following items in the second zone (i.e. ranks N+1, N+2, . . . ). In this embodiment, a second camera (12) (i.e. second reader), mounted on the line and connected to the controller (10), is operable to take an image of the item identifier on an item of rank (N+1) (counted from the first collected item in the batch of N items collected by the collector, see FIG. 1) within the second zone (5) and disposed just before the entrance of the pusher (7), at the level, but just before sensor (9), as shown on FIG. 1. This placing makes the system particularly robust to errors in case there is a fault or jam in the transport or collection operations.

When a batch signal is delivered by the sensor (9) to the controller (10), indicating that the pusher (7) is full with items 1 to N, the controller (10) triggers the second camera (12) to read the unique item identifier on the test item corresponding here to item (N+1) at a corresponding test position which is at the level, but just before sensor (9), i.e. corresponding to the first item to be collected by the pusher (7) to form the next batch. The second camera (12) is also equipped with an illumination source (not shown) for sequentially illuminating each item crossing the second zone (i.e. the view field of said second camera). Alternatively, the second camera may be triggered by sensor (9) (i.e. upon delivering of the batch signal). The second camera then sends corresponding second reader signal to the controller (10). The controller (10) extracts a unique item identification data from the received second reader signal. Once said unique item identification data from the second reader signal is extracted, the result being a unique test item identification data, then the controller searches in the list (16) which unique item identification data (i.e. which unique item identification data already extracted from a first reader signal previously sent to the controller) matches (i.e. is identical with) said unique test item identification data. In this embodiment, in case the controller fails to extract a unique item identification data from a received first reader signal or a received second reader signal, it respectively delivers a first or a second identification error data as the unique item identification data respectively corresponding to said received first or second reader signal. In fact, the above identification error data may be as simple as a special character on a line of the list (each line of the list corresponding to one identification data) corresponding to "no identification data registered".

The result of the above search is a matching unique item identification data. Due to the ordering of the items, here a mere single file order, this matching unique identification data in fact corresponds to said at least one test item N+1 which has been first read by the first camera (11) (see the list (16), line corresponding to item ID data of item of rank N+1) and later read by the second camera as test item at test position corresponding to rank N+1: as a consequence, unique identification data in the list (16) corresponding to the N items identified before the item of rank N+1, i.e. the unique identification data on lines corresponding to ranks 1 to N indicated on FIG. 4, are those of the batch (8) of items packed in the batch packaging (and of which detection by the sensor (9) has triggered the reading of item N+1 by the second camera).

The unique ID data specified at each one of the N lines of the list preceding the line of the matching unique item identification data, i.e. line corresponding to rank N+1 (as the list is searched in the reverse order), are retrieved by the controller and associated in the memory as corresponding to items of a same batch.

Also upon delivering of the batch signal by sensor (9), the pusher (7) pushes the batch (8) of N items just formed in the packaging device which packs said batch (8) into a batch packaging (13) already marked with a batch barcode (14) (i.e. batch identifier) and delivers a corresponding packed batch (15). Then a third camera (i.e. third reader) connected to the controller (10) and triggered by such delivering of the packed batch (15), reads the batch barcode (14) on the packed batch (15) and sends a corresponding third reader signal to the controller (10). The controller (10) then extracts the batch identification data (i.e. decodes batch barcode (14)) from the received third reader signal and stores in the memory this batch identification data associated to the above retrieved unique item ID data specified at each one of the N lines of the list preceding the line of the matching unique ID data, i.e. the unique item identification data corresponding to the packed batch. From this association of batch content data (item identification data) and package data (packed batch identification data), reliable track and trace operations are made possible.

The invention is not limited to the above embodiments and various modifications may be made without departing from the scope of the invention as defined by the claims. For example, the memory may be distributed (like the processing means): at least part of the memory, for example for storing associated batch content data and package data may be in a remote database connected to the controller. As another example, the readers may have their own storage capacities. Thus, although being designated as memory of the controller in the above description of the invention, said memory may in fact be distributed between several units connected to the controller.

The invention also includes a computer program product operable to make a computer connected to a system for controlling items on a production/distribution line, as described above, implement the steps of the method according to the invention (as described above), when running on said computer.

The method and system for identifying items on a production line according to the invention, in any of its above mentioned aspects, may be used with a high level of confidence for item identification in industry for many applications such as, for example, determining a production volume on said production line (for tax value estimation, etc. . . . ), line production control, line production inspection (for fraud detection, etc. . . . ).

The invention claimed is:

1. Method for controlling items on a production/distribution line, the items being transported arranged according a given disposition along a transport path from a first zone toward a second zone on the line, each transported item being marked with a unique item identifier including unique item identification data of the item, the items transported from the second zone being collected by a collector device forming a batch of a given number N of said items, said collector device including a sensor configured to detect that a batch of N items has been formed and deliver a corresponding batch signal, wherein a first reader reads the unique identifier on each one of the items within said first zone, the first reader being connected to a controller and sending corresponding first reader signal to the controller, the controller extracting each unique item identification data from the received first reader signal in accordance with an ordering corresponding to said given disposition of the items, the method comprising:

sequentially storing in a memory connected to the controller, forming a list of unique item identification data, each unique item identification data extracted from said first reader signal according to an ordering corresponding to said given disposition of the items, by the controller;

upon delivering of a batch signal by the sensor, reading at least one unique item identifier previously read with the first reader on at least one test item at a corresponding test position according to said ordering within the second zone by a second reader connected to the controller, the second reader sending corresponding second reader signal to the controller;

extracting each unique item identification data from a received second reader signal, and searching in the list the unique item identification data matching said unique item identification data extracted from the second reader signal obtaining matching unique item identification data corresponding to said at least one test item, and retrieving in the list, according to said ordering and test position, among the unique item identification data preceding said matching unique item identification data and which correspond to unique item identification data of the N items forming the batch of collected items, at least one unique identification data by the controller; and storing in the memory said retrieved at least one unique item identification data as corresponding to an at least one item of the batch of collected items, by the controller.

2. Method according to claim 1, wherein, in case the controller fails to extract a unique item identification data from a received first reader signal or a received second reader signal, it respectively delivers a first or a second identification error data as the unique item identification data respectively corresponding to said received first or second reader signal.

3. Method according to claim 2, wherein, in case the controller extracts a unique item identification data from a received second reader signal but fails retrieving a matching unique item identification data in the list, the controller delivers an error message indicating a matching error.

4. Method according to claim 3, further comprising, in case an error message is delivered, of storing said error message in the memory.

5. Method according to claim 4, further comprising, in case an error message is delivered by the controller, associating in the memory said error message with the corresponding extracted batch packaging identification data of the batch packaging of the delivered packed batch, by the controller.

6. Method according to claim 2, wherein, in case the controller fails to extract a unique item identification data from a received second reader signal and fails retrieving a matching second identification error data in the list, the controller delivers an error message indicating an extraction error relating to a second reader signal.

7. Method according to claim 2, wherein, in case the controller fails to extract a unique item identification data from a received second reader signal but retrieves a matching first identification error data in the list, the controller delivers an error message indicating an extraction error relating to both a first and a second reader signal.

8. Method according to claim 1, wherein said collector device is configured to deliver a batch of N collected items to a packaging device connected to the controller and configured to pack the batch of N items delivered by the collector device into a batch packaging marked with a batch identifier including batch packaging identification data, comprising:
- upon delivering of a batch signal by the sensor, packing the batch of items received from the collector device into a batch packaging to form a packed batch, and delivering said packed batch by the packaging device;
- reading the batch identifier on the batch packaging of said delivered packed batch by a third reader mounted on the line and connected to the controller, the third reader sending corresponding third reader signal to the controller;
- extracting batch packaging identification data from the third reader signal received from the third reader and storing the extracted batch packaging identification data in the memory associated with said retrieved at least one unique item identification data corresponding to an at least one item of the batch of collected items packed into said delivered packed batch, by the controller.

9. System for controlling items on a production/distribution line, comprising a transport operable to transport items arranged according a given disposition along a transport path of the line from a first zone toward a second zone on the line, each transported item being marked with a unique item identifier including unique item identification data of the item, a collector device operable to collect the items transported from the second zone to form a batch of a given number N of said items and deliver said formed batch of items, said collector device including a sensor configured to detect that a batch of N items has been formed and deliver a corresponding batch signal, the system further comprising a first reader mounted on the line configured to read a unique item identifier on each one of the items within the first zone and deliver corresponding first reader signal, and a controller connected to the first reader configured to receive a first reader signal and extract each unique item identification data from said received first reader signal in accordance with an ordering corresponding to said given disposition of the items, wherein:
- the controller is configured to sequentially store in a memory connected to the controller each unique item identification data extracted from said first reader signal according to said ordering, to form a list of unique item identification data;
- upon delivering of a batch signal by the sensor, a second reader connected to the controller is configured to read at least one unique item identifier previously read with the first reader on at least one test item at a corresponding test position according to said ordering within the second zone, the second reader being configured to send corresponding second reader signal to the controller;
- the controller is configured to extract each unique item identification data from a received second reader signal, search in the list the unique item identification data matching the unique item identification data extracted from the second reader signal to obtain matching unique item identification data corresponding to said at least one test item, and retrieve in the list, according to said ordering and test position, among the unique item identification data preceding said matching unique item identification data and corresponding to unique item identification data of the N items forming the batch of collected items, at least one unique item identification data; and
- the controller is further configured to store in the memory said retrieved at least one unique item identification data as corresponding to an at least one item of the batch of collected items.

10. System according to claim 9, wherein in case the controller fails to extract a unique item identification data from a received first reader signal or a received second reader signal, it is configured to respectively deliver a first or a second identification error data as the unique item identification data respectively corresponding to said received first or second reader signal.

11. System according to claim 10, wherein, in case the controller extracts a unique item identification data from a received second reader signal but fails retrieving a matching unique item identification data in the list, the controller is configured to deliver an error message indicating a matching error.

12. System according to claim 11, wherein, in case an error message is delivered by the controller, the controller is further configured to store said error message in the memory.

13. System according to claim 12, wherein, in case an error message is delivered by the controller, the controller is further configured to associate in the memory said error message with the corresponding extracted batch packaging identification data of a batch packaging of a packed batch delivered by the packaging device.

14. System according to claim 10, wherein, in case the controller fails to extract a unique item identification data from a received second reader signal and fails retrieving a matching second identification error data in the list, the controller is configured to deliver an error message indicating an extraction error relating to a second reader signal.

15. System according to claim 10, wherein, in case the controller fails to extract a unique item identification data from a received second reader signal but retrieves a matching first identification error data in the list, the controller is configured to deliver an error message indicating an extraction error relating to both a first and a second reader signal.

16. System according to claim 9, wherein, said collector device is configured to deliver a batch of N collected items to a packaging device connected to the controller and operable to pack the batch of N items delivered by the collector device into a batch packaging marked with a batch identifier including batch packaging identification data, wherein:
- upon delivering of a batch signal by the sensor, the packaging device is configured to pack the batch of items received from the collector device into a batch packaging to form a packed batch, and deliver said packed batch;
- a third reader mounted on the line and connected to the controller is configured to read a batch identifier on the batch packaging of a packed batch delivered by the packaging device, the third reader being configured to send corresponding third reader signal to the controller; and
- the controller is configured to extract batch packaging identification data from a third reader signal received from the third reader and store the extracted batch packaging identification data in the memory associated with retrieved at least one unique item identification data stored in the memory corresponding to an at least one item of the batch of collected items packed into said delivered packed batch.

* * * * *